United States Patent [19]
Johansson et al.

[11] Patent Number: 5,174,350
[45] Date of Patent: Dec. 29, 1992

[54] METHOD AND DEVICE FOR CUTTING OFF TREE TRUNKS

[75] Inventors: Berthold Johansson; Ola Friström, both of Umeå, Sweden

[73] Assignee: Explosiv Utveckling AB, Umea, Sweden

[21] Appl. No.: 773,935

[22] PCT Filed: Mar. 27, 1990

[86] PCT No.: PCT/SE90/00195
§ 371 Date: Nov. 5, 1991
§ 102(e) Date: Nov. 5, 1991

[87] PCT Pub. No.: WO90/13998
PCT Pub. Date: Nov. 29, 1990

[30] Foreign Application Priority Data

May 18, 1989 [SE] Sweden .............................. 8901786

[51] Int. Cl.⁵ .............................................. A01G 23/08
[52] U.S. Cl. .................................... 144/33 S; 42/106; 89/1.1; 144/2 Z; 144/3 D; 144/34 R; 144/343; 144/336
[58] Field of Search ............................ 42/106; 89/1.1; 144/2 R, 2 Z, 3 D, 34 R, 33 S, 336, 343

[56] References Cited

U.S. PATENT DOCUMENTS

| | | | |
|---|---|---|---|
| 2,707,008 | 4/1955 | Bannister | 144/3 D |
| 3,532,141 | 10/1970 | Kammer | 144/34 R |
| 4,063,359 | 12/1977 | Luscombe | 144/34 R |
| 4,646,799 | 3/1987 | Cobb | 144/193 G |

Primary Examiner—W. Donald Bray
Attorney, Agent, or Firm—Sughrue, Mion, Zinn, Macpeak & Seas

[57] ABSTRACT

The invention relates to a method and a device for cutting off the trunk of a tree by detonation of an explosive charge in contact with the trunk. The invention solves the problem of providing a safe and convenient way of cutting off the trunk of a tree which has fallen to an inclined position where it rests against another tree or against an electric overhead line. To the trunk there is, at the desired level above ground, attached a holder which carries an explosive charge and can from the ground be mounted on the trunk, whereupon the charge is detonated and the trunk section above the cut-off level severed from the section below. In this way the top section is either directly released from its support or can conveniently be so released.

5 Claims, 2 Drawing Sheets

METHOD AND DEVICE FOR CUTTING OFF TREE TRUNKS

BACKGROUND OF THE INVENTION

When forest trees are storm-felled it generally happens that trees standing close to electric overhead lines or to telephone lines fall against those lines. The falling tree often does not break the lines, in any case not all the wires thereof, but is halted in an inclined position with its top supported by the wires. In such situations the angle formed between the tree trunk and a horizontal plane is typically between 60° and 80°.

It is imperative that storm-damaged areas are cleared as soon as feasible because, especially in winter time, any interruption of the supply of electric power or of the telecommunication network may have a grave impact. In that context, it should be observed that also a very tall, and consequently very heavy, tree may be found in a position where it does not break electric wires or cables but only cause them to sag, namely because most of the weight of the tree is absorbed by an adjacent tree that is still in an upright position. However, even if the wires are not broken when the tree falls, there is a significant risk of it later sliding off its supporting neighbour, continuing its falling movement, and breaking the wires in the process. Consequently, also such a tree must as soon as possible be moved out from its dangerous position.

It should also be noted that, in most cases, it is not possible to relieve the wires by sawing off the trunk at a level rather close above ground because the only result of such an operation is that the base of the trunk slides down from the stump formed and comes to rest on ground. This causes the tilt angle of the trunk to increase a little, i.e., its deviation from the vertical is slightly reduced, but the tree remains hanging with its branches in contact with the wires.

For safety reasons, one cannot resort to the alternative solution of sending somebody climbing up the tree for the purpose of sawing the trunk off at a higher level. That expedient would expose the climber to at least three risks—the risk of being injured by the saw during the work, the risk of being injured if and when the tree falls, and the risk of coming into contact with live electric wires. For the above-mentioned reasons, the only practical solution so far has been to drag the tree root end sidewise to a position where the top is disengaged from the wires and falls to ground. This solution, however, call for use of a tractor or some similar equipment, which is no big problem when the line passes along a road, but may be very difficult and time-consuming when it runs through a power line in undulating terrain.

There is another factual circumstance adding to the risks present in clearing work. Such work is generally carried out by linesmen employed by a power distribution company or by a telephone company, as the case may be; a staff category unaccustomed to forestry work. As has been indicated above, a further complication is that such work must as a rule be performed under time stress and, in addition thereto, often under straining environmental conditions such as darkness, strong winds and falling precipitation.

SUMMARY OF THE INVENTION

The object of the present invention is substantially to eliminate the above risks. The invention is based on the realization that it is actually possible, without using saws, to cut off the trunk of an inclined tree at such a high level that the tree top does not remain hanging but falls to ground, and that this operation can be carried out without exposing the workers to risks as discussed above. The reason for this is, as will be described in more below, that when the trunk is cut, the staff may be at a safe distance therefrom. Moreover, the workers will never be exposed to the risk of coming into contact with live wires.

According to the invention, a device, suitably in the form of two pivotably interconnected ring halves and supporting an explosive charge, is from ground mounted on the tree trunk where it is to be cut off. This work can be performed by means of a long rod to the top end of which the device is releasably attached. The rod is then removed and the charge is, from ground, caused to detonate whereby the trunk is cut off.

Two embodiments of the invention will now be described with reference to the drawing.

DETAILED DESCRIPTION OF THE PREFERRED EMBODIMENTS

Figure 1:
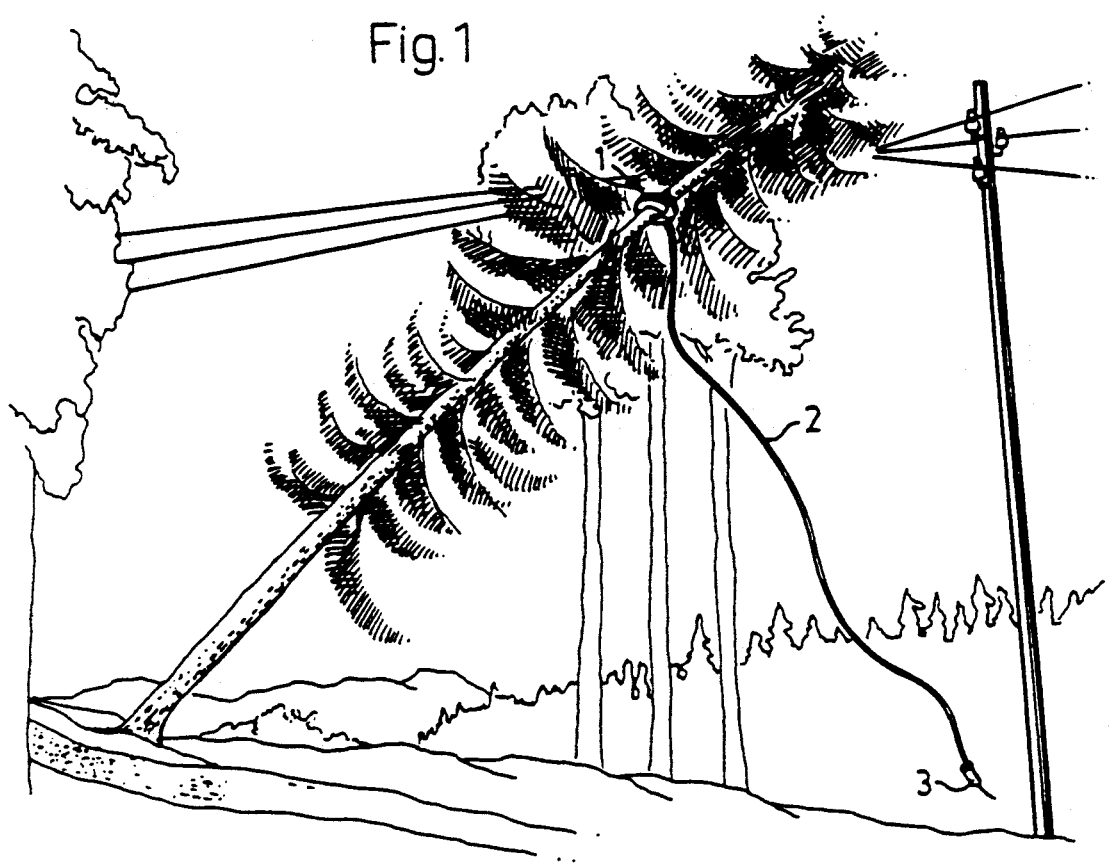
FIG. 1 shows a tree which has fallen but been halted and supported by a bundle of electric power wires.
Figure 2:
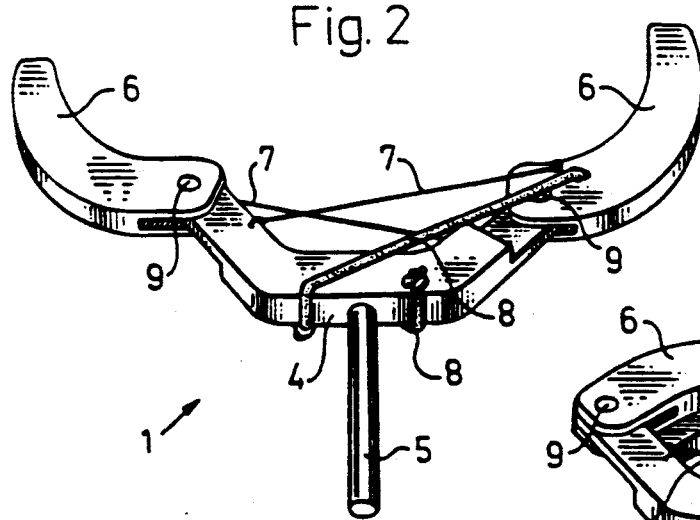
FIG. 2 is a perspective view showing, in its open position, a device that can be used for carrying out the method of the invention.
Figure 3:
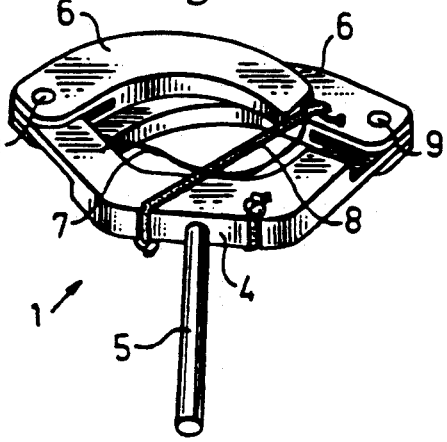
FIG. 3 corresponds to FIG. 2 but shows the device in its closed position.

In the embodiment shown in FIGS. 1-3, reference numeral 1 designates a device adapted to be mounted rather high up on the trunk of a tree. It is assumed that the tree has by strong winds been brought into the inclined position shown in FIG. 1 where its root system is still engaging ground and its top section rests against electric wires of an overhead electric power transmission line. The device 1 surrounds all or most of the trunk and, as will be described below, is provided with an explosive charge To that charge there is connected the one end of a cordtex fuse wire 2, the opposite, lower end of which is connected to an ignition fuse 3.

FIGS. 2 and 3 show in detail the structural nature of device 1. As shown therein, the device comprises a central yoke 4 from which there extendsa pin 5, directed downwards, and a pair of arms 6 which at point 9 are pivotably mounted on the yoke. Pin 5 is intended to be received in the hollow top end of a so-called telescopic rod, an implement included in linemen's standard equipment.

Using such a rod or any other similar rod or tube a person standing safely on ground can bring device 1 into a position close to the tree trunk at a level high above ground. According to this embodiment both yoke 4 and arms 6 consist of a plastic material and are hollow, their interior cavities being filled with an explosive substance.

As appears from FIG. 2, in the open position of the device, a thin wire 7 extends between a point close to the inner end of each arm 6 and yoke 4. Also, a strong rubber band 8 interconnects each arm with the yoke web, the rubber bands being, in a tensed condition, mounted, the one on the top surface and the other below the device. In FIG. 2 they pass directly above pivots 9.

The function of the device is as follows. It has already been mentioned how it is brought into a position close to the trunk. Upon a continued sidewise movement of the device the trunk will contact wires 7 causing them to turn arms 6 inwardly. When those movements have progressed to positions in which rubber bands 8 have passed pivots 9, the bands rapidly pull arms 6 inwards whereby the device will circumferentially surround the tree trunk and remain in that position. The next step is to pull the mounting rod downwards, releasing it from pin 5 whereupon the explosive charge can be made to detonate for the purpose of cutting off the trunk at the mounting location of the device.

The detonation can be triggered in several ways. One way is to connect a fuse wire as shown in FIG. 1, a second way is to embed an ignition cap in the charge and to activate the cap via an electric wire, and a third method way is to activate it by remote control, using radio signals sent from a portable transmitter on ground.

Figure 4:
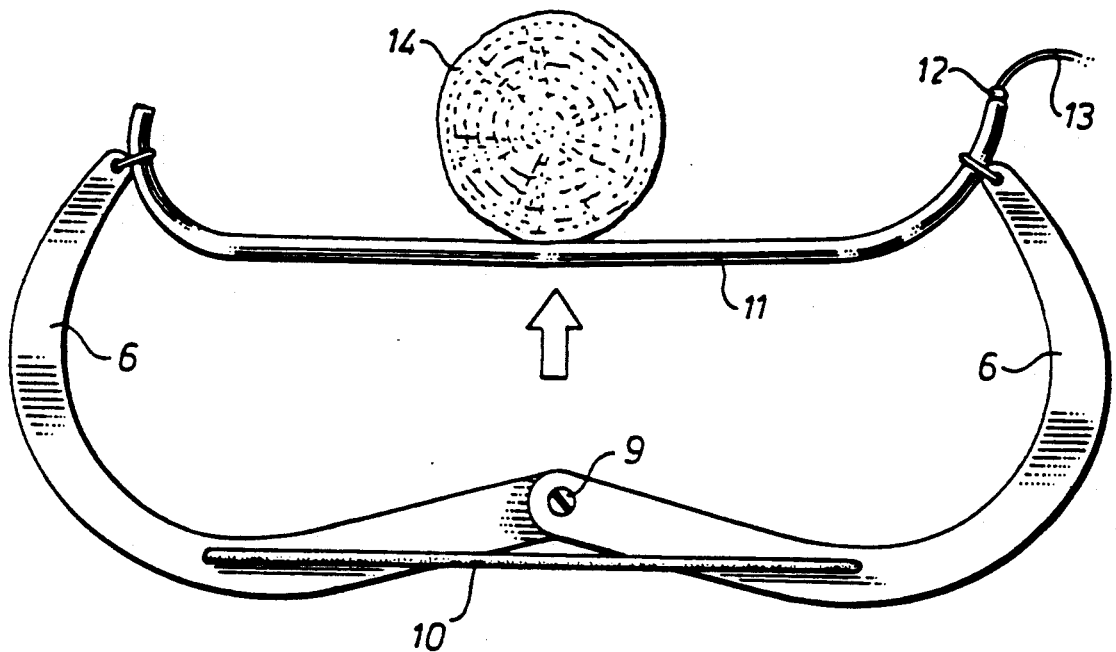
FIG. 4 is a plane view of a device, shown in its open position, according to a second embodiment.
Figure 5:
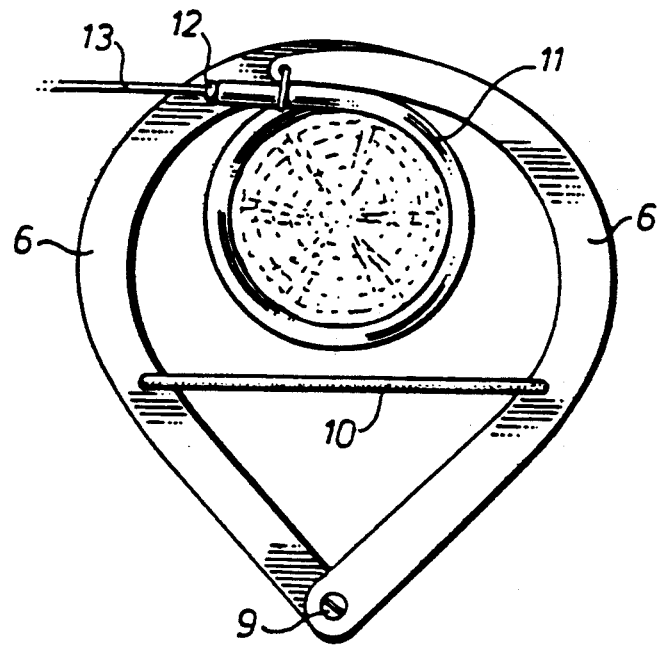
FIG. 5 corresponds to FIG. 4 but shows the device in its closed position

The device according to the second embodiment shown in FIGS. 4 and 5 likewise comprises two arms 6 but they are not mounted on a central yoke Instead, they are directly interconnected by means of a pivot pin 9 the head of which is countersunk so that its top surface is flush with that of the uppermost arm. The purpose of this is to make sure that it does not obstruct the passage of a tension spring 10, preferably constituted by a rubber cord, having its ends connected to each of arms 6. Between the free ends of arms 6 there extends a flexible hose 11 housing the explosive charge and, at its one end, an ignition cap 12 which by a wire 13 is connected to some suitable triggering equipment on ground as explained above. It is appreciated that the device also comprises means (not shown) equivalent to pin 5 in FIGS. 2 and 3, whereby it can be handled from ground in terms of being brought into its operating position on a tree trunk. Such means could, as one alternative, consist of a fork, the fingers of which are detachably received in bores in one or both of the arms. Hose 11 has a second function—in the open position of the device it is stretched to such an extent that it balances the opening force of the rubber cord 10. When the device is moved in the direction of the arrow in FIG. 4, hose 11 will contact the trunk 14 and, upon continued movement, cause arms 6 to turn around pivot 9. When rubber cord 10 has passed the pivot axis, the tensional force accumulated in it will bring arms 6 into their closed position as shown in FIG. 5, which also illustrates that charge hose 11 then surround the tree trunk 14. The device is now ready for detonation.

As is understood, the method of the invention can be carried out with the use of charge-supporting devices different from the two examples here described. The device may be made of wood or a plastic material and the explosive charge can be arranged in other ways than inside two arms or a hose. One skilled in the art could also select other resilient and closure means than those illustrated.

We claim:

1. A method for cutting off the trunk of and felling to gorund a tree which has fallen to an inclined position resting against an electric overhead line or against another tree, comprising the steps of:
   mounting, using an implement handled from ground, an explosive charge below a part of the trunk resting against said line or other tree, and
   subsequently detonating said charge.

2. A method as claimed in claim 1, further comprising using an explosive charge supported by a holder, manipulating the implement to cause the holder to surround at least a major portion of the trunk circumference, and releasing the implement from the holder.

3. A method as claimed in claim 2, comprising using a holder having two curved, pivotably interconnected parts, bringing said holder close to the trunk into a position where the trunk can enter an open space between said parts, and causing said parts to pivot into said trunk-surrounding position.

4. A device for cutting off the trunk of and felling to ground a tree which has fallen to an inclined position resting against an electric overhead line or against another tree, comprising:
   a holder supporting an explosive charge,
   elongate rod means, operable from the ground, for mounting said holder on the trunk below a part thereof resting against said line or other tree, and
   means for initiating a detonation of said explosive charge from the ground.

5. A device as claimed in claim 4, wherein said holder comprises:
   a central, substantially U-shaped yoke having two arcuate shanks pivotable relative to the yoke, and
   wire and spring means arranged between the yoke and shanks such that the holder may be brought into a position, by the rod means, where it is automatically caused to surround the trunk.

* * * * *